United States Patent Office 3,157,702
Patented Nov. 17, 1964

3,157,702
CHEMICAL PROCESS FOR PREPARING
CYCLOHEXANONE OXIME
Carl B. Flack, Woodbury, and David O. Halvorson, Pitman, N.J., assignors to E. I. du Pont de Nemours and Company, Wilmington, Del., a corporation of Delaware
No Drawing. Filed Nov. 16, 1960, Ser. No. 69,567
11 Claims. (Cl. 260—566)

The present invention relates to the preparation of cyclohexanone oxime of high purity.

Cyclohexanone oxime is a valuable chemical compound which finds important use as an intermediate in the preparation of the commercially significant polyamide precursor, ε-caprolactam. To be suitable for conversion to high-quality ε-caprolactam, which is accomplished via the Beckman rearrangement, the cyclohexanone oxime must be of high purity. However, cyclohexanone oxime prepared by known procedures may contain varying types and amounts of impurities, depending upon the synthesis method. For example, in U.S. Patent 2,967,200, there is described a highly effective process for the reduction of nitrocyclohexane to cyclohexanone oxime by hydrogen in the presence of a hydrogenation catalyst and in the presence of lead. Conversions of nitrocyclohexane to cyclohexanone oxime in the range of 80 to 90% are readily obtainable by this process. However, the cyclohexanone oxime so produced contains cyclohexylamine, lesser amounts of cyclohexanone and, in some cases, N-cyclohexylhydroxylamine. If these by-products are not removed from the cyclohexanone oxime prior to the Beckman rearrangement, larger amounts of rearranging agent, e.g., sulfuric acid or oleum, are required, and the caprolactam so produced is not, per se, of polymer quality, i.e., must be further refined prior to polymerization.

Attempts have been made to purify cyclohexanone oxime by distillation. However, excessive degradation and hydrolysis of the oxime occurs, the separation of the by-products from the oxime is incomplete, and some of the oxime is lost overhead in the distillate. Other methods of separating by-products from the oxime also have been tried, including extraction with organic solvents or with water, but these, too, have not been very satisfactory.

The present invention relates to a process which obviates the difficulties encountered with previous techniques, i.e., which allows ready isolation of cyclohexanone oxime of high quality in good yield. This process involves removal of by-product cyclohexylamine and any N-cyclohexylhydroxylamine present from the cyclohexanone oxime product obtained by the method of the afore-described Foster and Kirby patent or by other processes which yield a nonacidic product. Only after the oxime is substantially free of the amino by-product, or by-products, is it subjected to further purification.

The process of the present invention involves the steps of treating a nonacidic mass containing a major amount of cyclohexanone oxime and a minor proportion, e.g., from about 5–30 weight percent of the total mass, of cyclohexylamine with an amount of aqueous mineral acid sufficient to adjust the pH to one in the range of from about 4 to 7 in the mass; allowing the acidified mass to stratify into an organic phase containing cyclohexanone oxime and an aqueous phase containing a cyclohexylamine salt; separating the two phases; and then further treating the organic phase, e.g., extracting or distilling, to isolate purified cyclohexanone oxime. In the stratification step, it has been found desirable to include a liquid, water-immiscible compound, e.g., a hydrocarbon, a halogenated hydrocarbon, or the like, to aid in the separation of the phases. This water-immiscible organic compound or composition, which hereinafter will frequently be referred to as a stratification adjuvant, may be introduced into the mass prior to or following the adjustment of the pH with mineral acid.

Another aspect of the present invention involves the possibility of recovering cyclohexylamine of high purity. In this connection, the aqueous phase produced by the steps outlined above is treated with a strong base in order to free cyclohexylamine (and any N-cyclohexylhydroxylamine present) from the mineral acid salt or salts formed in the acidification step. The aqueous alkaline solution so produced can be distilled to recover a cyclohexylamine-water azeotrope, any N-cyclohexylhydroxylamine present remaining in the distillation residue of this operation. To obtain anhydrous cyclohexylamine from the water azeotrope, the azeotrope is subjected to distillation in the presence of a chemically inert water-azeotroping compound such as toluene. Additional purification of the anhydrous cyclohexylamine, e.g., by one or more additional distillations, may be employed if desired.

Various embodiments of the process of the present invention are illustrated by the following examples, in which the parts are by weight.

*Example 1*

The cyclohexanone oxime-containing mixture used was obtained by hydrogenation of nitrocyclohexane in the presence of a catalyst of 5% palladium-on-acetylene black containing 1% of magnesium as a promoter and in the presence of lead (introduced as lead acetate) in an amount to provide a weight ratio of lead to palladium of 1/5, in accord with the method described in the aforementioned Foster and Kirby patent, followed by filtration to remove the catalyst. This mixture, consisting of 1000 parts of cyclohexanone oxime, 159 parts of cyclohexylamine, 94 parts of cyclohexanone, and 110 parts of water, was mixed with 450 parts of toluene and heated to 60–70° C. Then 87 parts of 98% sulfuric acid in 1650 parts of water was added with stirring to bring the pH of the mixture to 5.5. The mixture was allowed to stratify into two phases at 70° C., and the phases were separated. The toluene phase containing cyclohexanone oxime was water-washed twice at 70° C., 600 parts being used in each case, and the aqueous washes were combined with the original aqueous phase.

The toluene-oxime phase consisted of 894 parts of cyclohexanone oxime, 93 parts of cyclohexanone, 430 parts of toluene, and 40 parts of water. The water, toluene, and cyclohexanone were removed by vacuum steam distillation at 280 millimeters of mercury and a reflux ratio of 0.2/1 until the temperature of the still contents was a maximum of 60° C. The residual material after the removal of the water-toluene-cyclohexanone consisted of 853 parts of cyclohexanone oxime, 4 parts of cyclohexanone, and 9 parts of water. This material was rearranged to ε-caprolactam by the procedure described in U.S. Patent 2,487,246 to W. B. Johnson and R. S. MacCormack. The ε-caprolactam product recovered was of polymer quality as determined by standard analytical procedures.

The overhead product from the distillation to remove water, toluene, and cyclohexanone from the oxime stratified into two phases which were separated by decantation. The toluene-cyclohexanone layer was distilled to obtain a toluene fraction suitable for recycle in the process and a cyclohexanone fraction.

The aqueous phase, which contained cyclohexylamine as the sulfate, plus the combined material from the water washes of the organic phase referred to above, was extracted six times with toluene in a countercurrent procedure effected at 60° C. to remove dissolved cyclohexanone oxime and cyclohexanone. The resulting toluene extract containing 91 parts of cyclohexanone oxime and 16 parts of cyclohexanone was suitable for processing in the toluene-cyclohexanone stripping operation described above.

The essentially oxime- and ketone-free aqueous solution contained 157 parts of cyclohexylamine (as the neutral sulfate). Sodium hydroxide (as a 50% aqueous solution) was added to this solution in the amount of 65 parts. The free cyclohexylamine then was removed as an aqueous azeotrope containing 44% of the amine by distillation at atmospheric pressure. The water was removed from the azeotrope by adding toluene and boiling off a toluene-water azeotrope. Anhydrous cyclohexylamine remained. This material was fractionated to give a 120-part fraction of high-quality cyclohexylamine.

*Example 2*

One thousand (1000) parts of a nitrocyclohexane reduction product obtained by the catalytic hydrogenation procedure referred to in Example 1 and containing 506 parts of cyclohexanone oxime, 113 parts of cyclohexylamine, 73 parts of cyclohexanone, 68 parts of nitrocyclohexane, and 240 parts of water was mixed with 335 parts of heptane (a commercial isomeric heptane mixture). The mixture then was brought to 60° C., and this temperature was maintained while the mixture was agitated vigorously and 1320 parts of 5% aqueous sulfuric acid was added to reduce the pH of the mass to 5.5. The aqueous and organic phases then were allowed to separate, and the organic phase subsequently was washed twice with 535 parts of water at 60° C.

The washed organic phase was distilled through a Vigreux column at 50 millimeters of mercury until the temperature of the still contents reached a maximum of 120° C. to remove the major portion of the heptane, water, cyclohexanone, and nitrocyclohexane. The residual cyclohexanone oxime was rearranged to ε-caprolactam of satisfactory quality by the procedure described in Example 1.

The aqueous phase and the washes from the aforementioned treatment of the organic phase were combined to make 2484 parts of a solution containing 56 parts of cyclohexanone oxime, 11 parts of cyclohexanone, 1 part of nitrocyclohexane, and 113 parts of cyclohexylamine (as the sulfate). This solution was extracted four times with 1100-part portions of heptane at 70° C. to remove the oxime and the ketone. The extracted aqueous solution then contained 113 parts of cyclohexylamine (as the sulfate), 6 parts of cyclohexanone oxime, and no cyclohexanone or nitrocyclohexane. The extracted solution was worked up as in Example 1 to recover cyclohexylamine of high purity. The heptane extracts containing cyclohexanone oxime and cyclohexanone were processable in a solvent-cyclohexanone stripping column to recover rearrangement-grade cyclohexanone oxime.

*Example 3*

A mixture of 64.77 parts of cyclohexanone oxime, 6.50 parts of cyclohexylamine, 0.23 part of cyclohexanone, and 130 parts of water was warmed to 60–65° C., and 98% sulfuric acid was added with vigorous agitation over a half-hour period until the pH of the mass fell to 5.6. Then 35 parts of benzene was added, and the organic and aqueous phases were separated at 60° C. The aqueous phase, amounting to 138.5 parts, contained 4.29 parts of cyclohexanone oxime, 0.61 part of cyclohexanone, 6.14 parts of cyclohexylamine (as the sulfate), and no cyclohexanone.

The organic phase, amounting to 96 parts, contained 60.06 parts of cyclohexanone oxime, 0.61 part of cyclohexanone, and 0.36 part of cyclohexylamine (as the sulfate). It was washed with 57 parts of water, after which it contained 59.14 parts of cyclohexanone oxime, 0.43 part of cyclohexanone, and less than 0.1 part of cyclohexylamine. This material then distilled to remove the benzene and cyclohexanone, after which it was rearranged to ε-caprolactam of high purity in accordance with the procedure of Example 1.

The combined aqueous phases, amounting to 195 parts, were extracted three times with 51-part portions of benzene. The extracted aqueous phase then contained 6.1 parts of cyclohexylamine sulfate and less than 0.2 part each of cyclohexanone oxime and cyclohexanone. Cyclohexylamine is recoverable from this solution by the method of Example 1.

*Example 4*

A mixture of 30.00 parts of cyclohexanone oxime, 3.25 parts of cyclohexylamine, and 15.00 parts of water was heated to 75° C., and 31.6 parts of 5% sulfuric acid was added slowly and with agitation to adjust the pH of the mixture to approximately 4. Stratification then was allowed to occur while the temperature was maintained at 75° C. The phases were separated and weighed. The cyclohexanone oxime-containing organic phase amounted to 26.70 parts, of which only 0.05% was cyclohexylamine and 0.67% cyclohexanone. After several water washings, no cyclohexylamine could be detected in this organic phase, and it was subjected to distillation to obtain purified cyclohexanone oxime. The aqueous phase amounting to 46.70 parts, together with the wash liquors from the extraction of the organic phase, were suitable for workup by the method of Example 1 to recover the cyclohexylamine contained therein.

The present process is particularly applicable to cyclohexanone oxime-containing reaction products obtained by the hydrogenation procedure disclosed in the aforementioned Foster and Kirby application and constitutes an improvement or a refinement of that prosess for obtaining high-quality cyclohexanone oxime thereby. The oxime-containing reaction mass from the hydrogenation step is first freed of the solid hydrogenation catalyst, for example, by filtration, which generally is conducted at elevated temperature to keep the organic materials in solution. The catalyst-free mass is treated, generally with agitation, with aqueous mineral acid in an amount sufficient to provide a pH of from about 4 to 7, and more particularly from approximately 5.5 to 6.5, in the mass. Sulfuric acid is the preferred mineral acid for economic reasons, but the other members of this class, particularly hydrochloric acid, can also be used. Addition of the acid converts any amino compounds, e.g., cyclohexylamine and N-cyclohexylhydroxylamine, to water-soluble mineral acid derivatives but has little or no effect on the oxime contained in the mass. For example, it has been determined that less than 1% of the oxime is hydrolyzed to cyclohexanone when the acidification is effected to the specified extent at approximately 60° C., either in the presence of absence of a stratification adjuvant.

Stratification then is allowed to occur. To facilitate the phase separation, i.e., to increase the density gradient between the phases and to minimize emulsion formation, it is preferred to add a water-immiscible, normally liquid organic compound as a stratification adjuvant either before or after the acidification step. The adjuvant, should, of course, be chemically inert to all constituents of the mixture. Suitable adjuvants include the normally liquid aromatic hydrocarbons, such as benzene, toluene, and one or more of the xylene isomers; the liquid aliphatic hydrocarbons, such as the commercially available mixed heptane isomers and cyclohexane; and halogen-substituted liquid hydrocarbons, particularly the chloro derivatives, e.g., the chloroethylenes and chloroethanes, chloroform, and the chlorinated benzene hydrocarbons. These adjuvants may be used singly or in combination. For example, mixtures of aliphatic hydrocarbons and chlorinated aliphatic hydrocarbons are effective. Other liquid hydrocarbon derivatives, including higher-molecular-weight oxygenated derivatives, e.g., cyclohexanone, and nitro derivatives, e.g., nitrocyclohexane, can also be used, provided that they are substantially inert and water-immiscible.

The amount of stratification adjuvant used will depend on the type of compound. For example, when aromatic hydrocarbons, such as benzene or toluene, are used, as little as 10 weight percent, based on the cyclohexanone oxime in the mass being treated, is effective as an aid to stratification and phase separation. On the other hand, with heptane and other aliphatic hydrocarbons, it often is desirable to use a somewhat greater amount, e.g., 30–35 weight percent or more, based on the oxime being processed.

The temperature at which the acidification, stratification, and phase separation occurs will depend not only on the amount of oxime in the mass being processed but also on the type and amount of stratification adjuvant used, if any. Temperatures of from about 25 to 100° C. have been found generally suitable in the present process, the range of about 40 to 70° C. being particularly effective. Above 100° C., hydrolysis of the oxime often tends to become excessive, and no advantages are gained by operating above this temperature.

To achieve high material recoveries in the present process, it generally is desirable, following the separation of the phases, to extract residual organic material, including cyclohexanone oxime, from the aqueous cyclohexylamine-containing phase by one or more treatments with an organic solvent. This solvent may be the same compound as the stratification adjuvant or another organic compound which is a solvent for cyclohexanone oxime and cyclohexanone. The organic cyclohexanone oxime-containing phase likewise can be water-washed one or more times to extract traces of water-soluble material.

The substantially amine-free organic phase containing the oxime then is treated further to isolate purified cyclohexanone oxime. To this end, removal of solvents and impurities by distillation has been illustrated in the foregoing examples. However, it also is possible to recover the oxime in purified form by other procedures, e.g., via one or more extractions and crystallization. Cyclohexanone oxime recovered by extraction and crystallization will generally contain relatively larger amounts of cyclohexanone than are found in the oxime purified by distillation. However, the oxime purified by the latter procedure may be made suitable for conversion to ε-caprolactam since the cyclohexanone contained therein is readily convertible to the oxime by conventional methods.

The aqueous phase contains the cyclohexylamine salt of the acid used in the acidification step and possibly trace amounts of the salt of N-cyclohexylhydroxylamine. It is desirable that this solution be substantially free of cyclohexanone and cyclohexanone oxime prior to further processing, not only to avoid losses of these latter two compounds per se but also because these compounds can react with free cyclohexylamine. In the further processing, the aqueous solution is treated with at least a stoichiometric amount of a strong base, particularly an alkali-metal hydroxide, to obtain the free amino compound(s). For high recoveries of the cyclohexylamine, e.g., 95% or better, it has been found advantageous to use an excess of base over that theoretically required for the neutralization, e.g., up to 20 mole percent over the theoretical amount.

The free cyclohexylamine can be recovered from the aqueous neutralized mass by distillation. This operation, which yields a water-cyclohexylamine azeotrope, may be followed by removal of the water by a second distillation in the presence of a water-azeotroping inert solvent, such as benzene or toluene, to obtain a residue of anhydrous cyclohexylamine. High-quality cyclohexylamine is obtained from the anhydrous residue by further distillation. However, it also has been found that recovery of the cyclohexylamine from the neutralized mass can be accomplished by extraction with a suitable solvent therefor. Heptane, benzene, and toluene have each been demonstrated to be effective for this purpose. In this embodiment, the cyclohexylamine is then recovered from the extract as high-purity material by stripping off the solvent and subjecting the residual material to distillation.

The process of the invention can be carried out batchwise or continuously, with co- or countercurrent contact of the various process streams. It has been illustrated in detail with reduction products obtained by the catalytic hydrogenation of nitrocyclohexane according to the process of U.S. Patent No. 2,967,200 of R. E. Foster and A. F. Kirby. However, it also is applicable to nonacidic reaction products containing cyclohexanone oxime produced by other syntheses and to similar products containing other oximes, e.g., acetoxime and cyclopentanone oxime. Many other variations in the process will be suggested to those skilled in the art by the foregoing detailed specification. Accordingly, we intend to be limited only by the following claims.

We claim:

1. A process which comprises adding to a mass having a pH of at least about 7 and containing a major proportion of cyclohexanone oxime and a lesser proportion of cyclohexylamine an amount of aqueous sulfuric acid sufficient to adjust the pH of the mass to one in the range of from about 4 to 7 at a temperature in the range of from about 25 to 200° C.; allowing the acidified mass to stratify into an aqueous phase and an organic phase; separating said aqueous phase and said organic phase; and thereafter recovering purified cyclohexanone oxime from said organic phase.

2. A process which comprises adding to a mass having a pH of at least about 7 and containing a major proportion of cyclohexanone oxime and a lesser proportion of cyclohexylamine an amount of aqueous sulfuric acid sufficient to adjust the pH of the mass to one in the range of from about 4 to 7 at a temperature in the range of from about 25 to 100° C.; allowing the acidified mass to stratify into an aqueous phase and an organic phase in the presence of a liquid, organic, substantially water-immiscible liquid hydrocarbon stratification adjuvant; separating said aqueous phase and said organic phase; and thereafter recovering purified cyclohexanone oxime from said organic phase.

3. The process as claimed in claim 2, wherein the stratification adjuvant is in contact with the mass prior to the addition of the aqueous sulfuric acid.

4. The process as claimed in claim 2, wherein the stratification adjuvant is added to the mass following the addition of the sulfuric acid.

5. The process as claimed in claim 2, wherein the stratification adjuvant is toulene.

6. The process as claimed in claim 2, wherein the stratification adjuvant is benzene.

7. The process as claimed in claim 2, wherein the stratification adjuvant is heptane.

8. The process as claimed in claim 2, wherein the purified cyclohexanone oxime is recovered from the organic phase by distillation.

9. A process for the recovery of cyclohexanone oxime from a reaction mass having a pH of at least about 7 produced by the hydrogenation of nitrocyclohexane in the presence of hydrogenation catalyst which comprises separating the reaction mass from the hydrogenation catalyst; adding to the substantially catalyst-free reaction mass an amount of aqueous sulfuric acid sufficient to produce a pH of from about 4 to 7 in the mass at a temperature in the range of from about 25 to 100° C.; allowing the acidified mass to stratify into an aqueous phase and an organic phase in the presence of a liquid stratification adjuvant selected from the group consisting of the saturated aliphatic and aromatic hydrocarbons; separating said aqueous phase and said organic phase; and thereafter recovering cyclohexanone oxime from said organic phase.

10. The process as claimed in claim 9, wherein the amount of aqueous sulfuric acid added to the substantially catalyst-free reaction mass is sufficient to produce a pH of from 5.5 to 6.5 in the mass.

11. The process as claimed in claim 9, wherein the temperature is in the range of from 40 to 70° C.

References Cited in the file of this patent
UNITED STATES PATENTS
3,822,393     Nicolaisen et al. _____ Feb. 4, 1958

UNITED STATES PATENT OFFICE
CERTIFICATE OF CORRECTION

Patent No. 3,157,702

November 17, 1964

Carl B. Flack et al.

It is hereby certified that error appears in the above numbered patent requiring correction and that the said Letters Patent should read as corrected below.

Column 6, line 4, for "equeous" read -- aqueous --; line 40, for "200° C." read -- 100° C. --; line 64, for "toulene" read -- toluene --.

Signed and sealed this 11th day of May 1965.

(SEAL)
Attest:

ERNEST W. SWIDER
Attesting Officer

EDWARD J. BRENNER
Commissioner of Patents